Oct. 11, 1966 M. H. DAMON, JR., ETAL 3,278,851

PEAK DETECTOR FOR DOUBLET STORAGE PULSER

Filed Nov. 22, 1963 3 Sheets-Sheet 1

INVENTORS
LAWRENCE ROSENBERG
MELVIN H. DAMON, jr.
BY

Laurence S. Epstein
ATTORNEYS

PEAK DETECTOR FOR DOUBLET STORAGE PULSER

Filed Nov. 22, 1963 3 Sheets-Sheet 2

INVENTORS
LAWRENCE ROSENBERG
MELVIN H. DAMON, jr.
BY
Laurence S. Epstein
ATTORNEYS INVENTORS
LAWRENCE ROSENBERG
MELVIN H. DAMON, jr.
BY
Lawrence S. Epstein
ATTORNEYS 3,278,851
Patented Oct. 11, 1966

3,278,851

PEAK DETECTOR FOR DOUBLET STORAGE PULSER

Melvin H. Damon, Jr., Wayne, and Lawrence Rosenberg, Fair Lawn, N.J., assignors, by mesne assignments, to the United States of America as represented by the Secretary of the Navy Filed Nov. 22, 1963, Ser. No. 325,800
2 Claims. (Cl. 328—34)

This invention relates to a circuit for converting doublet, input bipolar signals to unipolar signals as originally constituted.

This invention has particular use in a doublet storage system which is described in detail in co-pending application Ser. No. 358,982, filed Apr. 9, 1964.

This doublet storage system basically includes a plurality of signal input information channels, each of the information channels providing a pulse amplitude sample of an audio signal, thereby producing pulse-amplitude modulation, referred to as PAM. The timing at which this modulation takes place is so controlled as to multiplex the plurality of information input channels in time, and then combining these PAM signals, thereby providing a PAM time-division multiplex system. The resulting time-multiplex train of sample or sub-carrier pulses, for the plurality of channels, are then doubleted. The resulting time-multiplexed train at the input of the doublet generator are referred to as the "signals as originally constituted." This "doubleting" provides, for each channel's sampled pulse coupled thereto, a bipolar doubleted pulse, which consists of the original PAM signal, followed immediately by the same input signal, but which is 180 degrees phase inverted. The purpose of this generation of doublets is to provide excellent low frequency response for the storage of analog information on a magnetic tape medium, that has a limited bandwidth as an intrinsic characteristic. This doubleted information is then recorded on one track of the tape recorder. It is later played back from the tape recorder and is fed into a first recycling detector and subtracter, which is the subject matter of this invention. The first recycling detector together with the subtracter, is referred to in this application as a "peak detector for doublet pulses." The purpose of this invention is to restore the incoming, train of bipolar doubleted pulses, in peak amplitude and phase, as they were originally constituted prior to their being doubleted in the record portion of the doublet storage system. The output of this doublet pulse peak detector is then coupled to a second recycling detector which returns this information to its original character, thereby providing a pulse train of squared-up pulses equivalent, both in amplitude and waveshape, to the input signals applied to the doublet generator. Additionally, a sliding gate, which is described in detail in co-pending application Ser. No. 358,982, filed Apr. 9, 1964, coupled to said second recycling detector, is used to demultiplex the squared-up pulse train, by discretely picking out the pulse amplitude information corresponding to a given signal input channel. Such selected signals are then passed through a filter to recover the analog signal from the pulse information, which is identical to the signal originally sampled.

One of the objects, therefor, of this invention, is to provide a circuit for converting bipolar doublet input signals to unipolar output signals as originally constituted.

Another object of the invention is to provide a circuit for separating the leading pulses from a doublet pulse pair train thereby providing a train of single pulses, each of whose amplitude is proportional in amplitude, and of the same polarity, as the corresponding leading pulse detected.

A further object of the invention is to provide a circuit for detecting the leading pulses of a train of bipolar doubleted pulses, thereby providing a train of individual pulses, each of whose amplitude is proportional in amplitude, and of the same polarity, as the corresponding leading pulse detected.

A still further object of the invention is to provide a circuit for detecting the leading component of an input bipolar signal.

These and further objects of the present invention are accomplished in the illustrative embodiment by providing a circuit, comprising a means for amplifying and inverting composite input bipolar signals or train of bipolar pulses. These amplified and inverted signals are then fed into two channels, a positive going channel, and a negative going channel. In the negative going channel, a phase inverter inverts the signal coupled thereto. The output signal from the phase inverter is then peak detected, as is the non-inverted signal in the negative going channel. The result is that the positive and negative components of the individual going signals, which constitute the composite input bipolar signals or train, are separated out, as they are fed to peak detectors, into their respective channels, which are capable of only detecting positive input signals coupled thereto. By proper recycling of these individual peak detectors, each of the PAM sample bipolar pulses, are successively and individually detected. These peak detected signals are then instantaneously subtracted from one another thereby providing an output signal which is a recreation of the leading component of the input composite bipolar PAM signal in amplitude and polarity.

Other objects and many of the attendant advantages of this invention will be readily appreciated, as the same becomes better understood by reference to the following detailed description when considered in connection with the accompanying drawings wherein.

Each of the components depicted in block form relates to a function for which apparatus is well known in the art so that it is believed unnecessary to provide detailed description thereof.

Figures 1, 2:
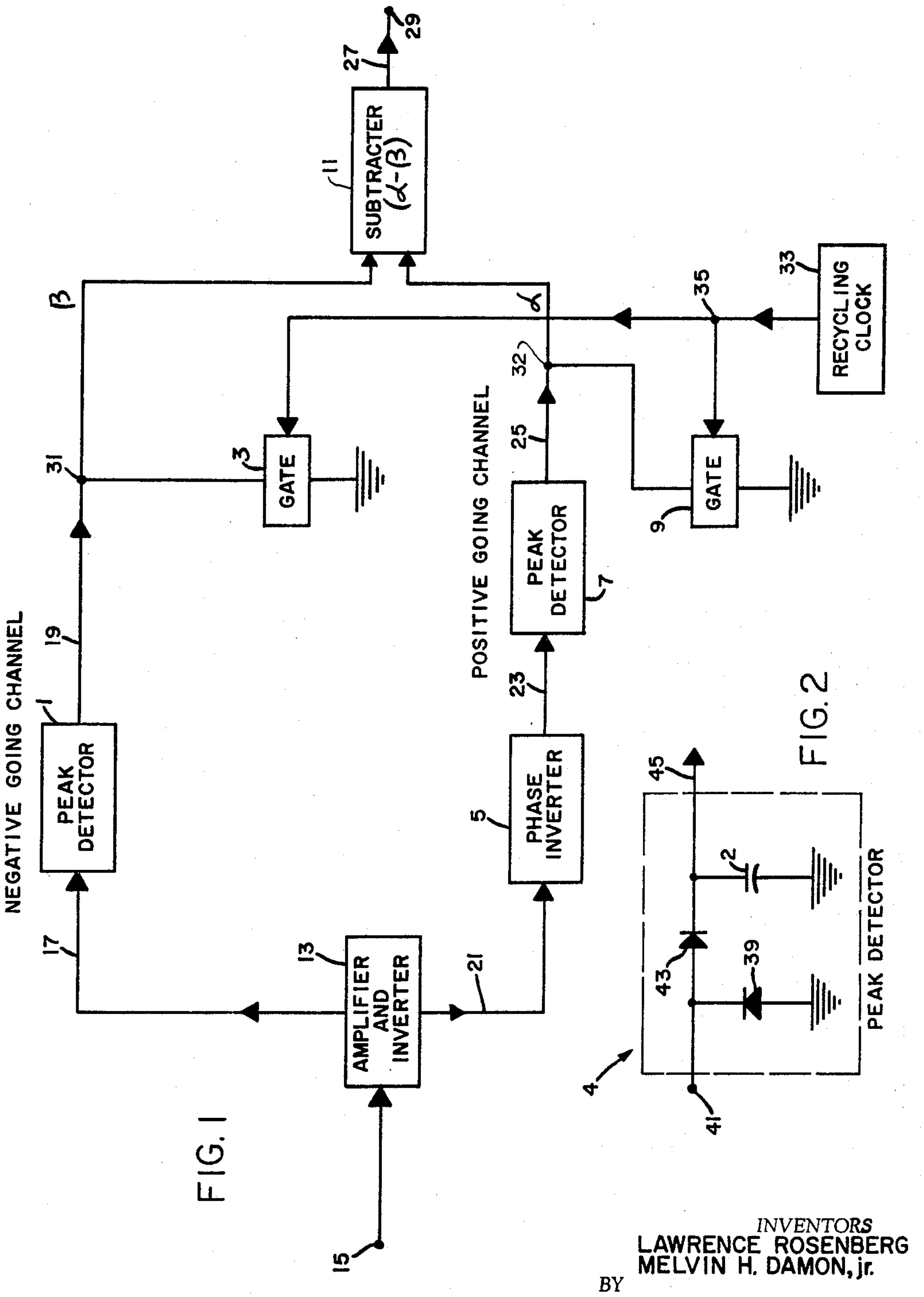
FIG. 1 is a functional block diagram of the doublet converter embodying the invention.
FIG. 2 is a schematic diagram of a peak detector which may be employed in the circuit of FIG. 1.

Referring to FIGS. 1 and 2, the invention broadly comprises detecting means and a subtraction means. The detecting means includes a first and second detecting means, recycling means, and coupling means for connecting the input bipolar signals to the first and second detecting means. More specifically, the invention includes a pair of channel means, the first of which is a negative going channel means, which comprises; a first peak detection means 1, having a first storage means, which may, for example, be the storage means 2, of the peak detector 4, described infra, illustrated in FIG. 2, for charging up to the peak amplitude of an input signal detected thereby, and a first gating means 3, coupled to said first storage means, for discharging it. The other channel, the positive going channel, includes; a phase inverter means 5, second peak detection means 7, having a second storage means for charging up to the peak amplitude of an input signal detected thereby, and a second gating means 9, coupled to said second storage means, for discharging it. Coupling means are also provided for connecting the input bipolar signals to the positive and negative going channel means. Subtraction means 11, which has coupled thereto, the output of the first and second storage means, provides instantaneous subtraction of the voltages stored in both the storage means. Each of the gating means 3 and 9, are operated at a repetition rate equal to the channel repetition rate of the input bipolar signals so as to provide successive detection of each of the individual informational PAM sample signals.

The invention includes an amplifier and inverter combination, referred to as an amplifier-inverter 13, which has the composite input bipolar signals or pulse train applied to terminal 15, to the input of the amplifier-inverter 13. The outputs of the amplifier-inverter 13 are applied to two channels, one of which is a negative going channel, and the other being a positive going channel. The output from the amplifier-inverter 13, applied to the negative going channel, is coupled to the input of the first peak detection means 1, over line 17. The output of the first peak detection means 1, is coupled over line 19, to one input of the subtracter 11. The other output of the amplifier-inverter 13, going to the positive going channel is coupled to the input of a phase inverter 5 over line 21. The output of this phase inverter 5 is coupled to the input of a second peak detection means 7, over line 23. The output of this second peak detection means 7, is then coupled to the other input terminal of the subtracter 11, over line 25. The subtracter 11, subtracts the signal at the output of the negative going channel from the signal at the output of the positive going channel. The output of the subtracter 11, is then coupled over line 27, to the output terminal 29. Also provided are two gates, 3 and 9, each of which is coupled to the output of its associated peak detection means 1, and 7, through terminals 31 and 32 respectively. A recycling means 33, has its output applied through terminal 35, to the inputs of each of the gates 3 and 9.

To more clearly describe the operation of the invention a schematic of a peak detector, which may be employed in the circuit of FIG. 1, is illustrated in FIG. 2. This peak amplitude detection means 4, includes a first diode 39, which shorts out to ground any negative input signal applied at terminal 41. A second diode 43 which allows positive input signals applied at terminal 41, to pass therethrough, is coupled, at one end, to an output storage capacitor 2, which is capable of charging up to the peak amplitude of an input signal applied thereto, and is coupled at its other end to terminal 41. The output of this peak detection means is then applied to one of the inputs of the subtracter 11, over line 45.

Figure 3:
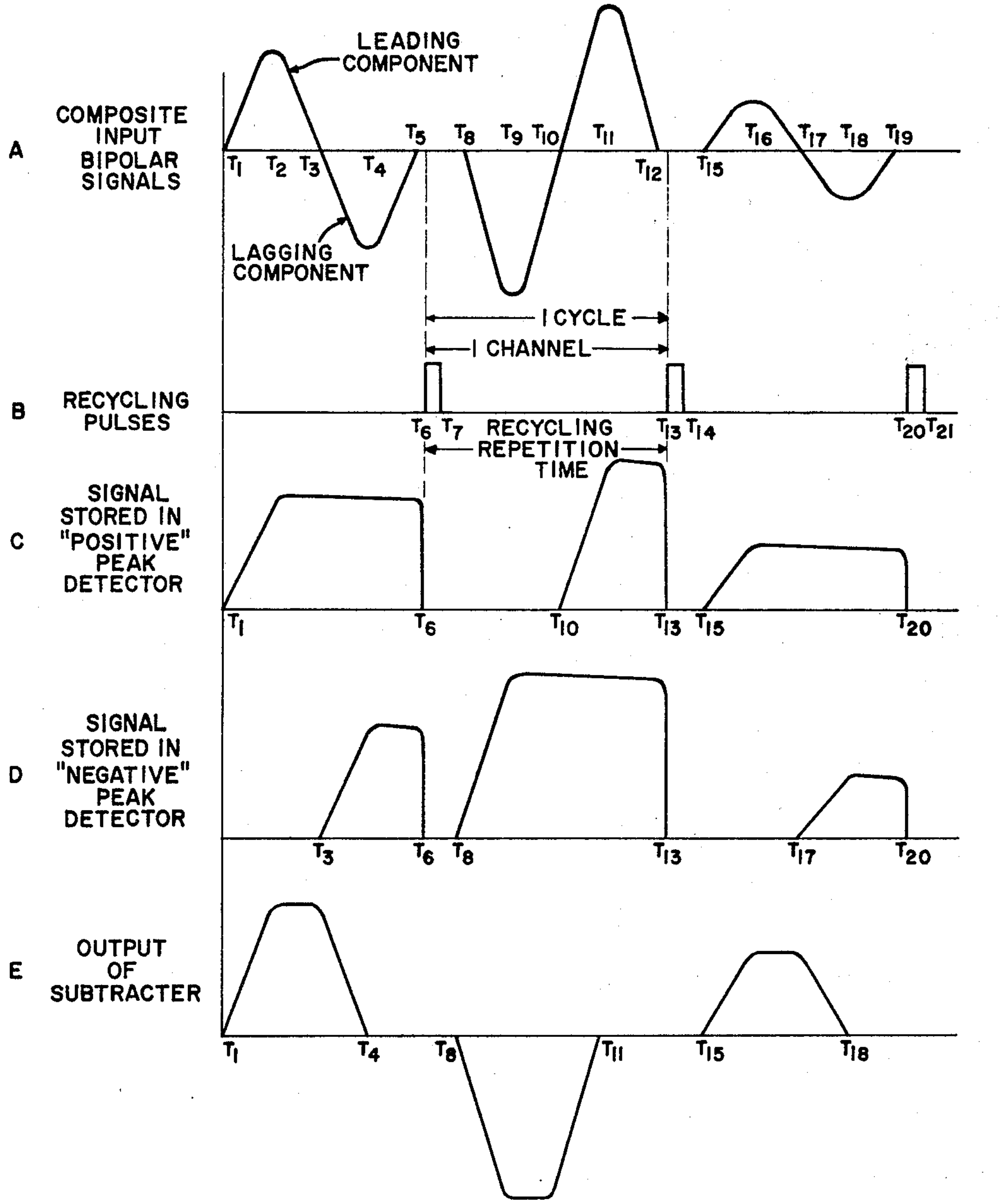
FIG. 3 is a series of waveforms useful in explaining the operation of the embodiment of FIG. 1.
Figure 4:
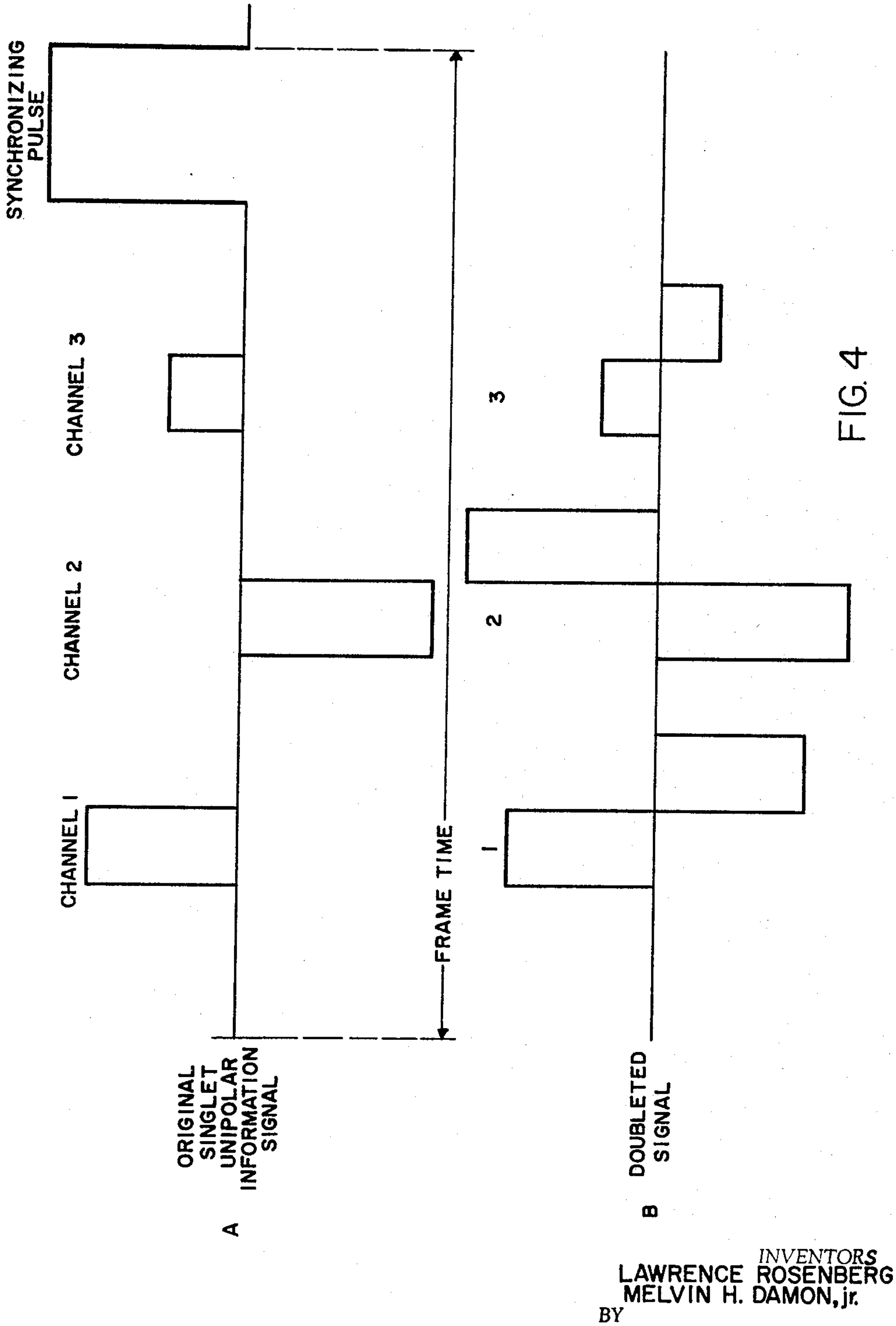
FIG. 4 is another series of waveforms useful in explaining the overall operation of the embodiment illustrated in FIG. 1.

Referring now to FIGS. 1 and 2 and the waveforms shown in FIGS. 3 and 4, the composite input bipolar signal, represented by curve "A," FIG. 3, which is the deteriorated doubleted time multiplexed sample pulses for three channels, is applied through terminal 15 to the amplifier-inverter 13. These amplified and inverted signals are then applied to the input of the first peak amplitude detection means 1, over line 17, in the negative going channel. As this signal has been amplified and inverted by the amplifier-inverter 13, only the lagging component thereof, during time interval T1 to T6, will be peak amplitude detected by this first peak amplitude detector 1. This is because the leading component of the signal seen at the input of the first peak amplitude detector 1, is now negative in this negative going channel, during time interval T1 to T6. Thus, the lagging component of the signal represented by curve A, existing during time T1 to T6, now appears as a positive signal, at the input of peak amplitude-detector 1, having been inverted only once, by amplifier-inverter 13, prior to detection. The leading component of the signal represented by curve A, appearing during the same time interval, T1 to T6, however appears as a negative signal at the input of the first peak detector 1, and is not detected. Thus, as the first peak detector 1, can only detect positive signals applied at its input, as explained previously, only the lagging component of the signal represented by curve A, in the time interval T1 and T6, will charge up the storage capacitor. This charging, represented by curve "D," FIG. 3, starts at time T3, and continues until T6, results in a voltage, charged in the storage capacitor, which is proportional to the peak amplitude of the lagging component of the signal represented by curve A, during such time interval. However, now referring to the positive going channel, the signal represented by curve A, having been amplified and inverted, during the same time interval, T1 to T6, is coupled, over line 21, to the input of the phase-inverter 5. This previously inverted composite signal represented by curve A is again inverted by phase-inverter 5, and is subsequently applied to the input of a second peak detector 7, over line 23. Thus the same signal represented by curve A, partially transmitted through the positive channel, during time interval T1 to T6, has been inverted twice, once by the amplifier-inverter 13, and again by phase-inverter 5. As the leading component of this input signal represented by curve A, has been inverted twice, there is now a positive going signal, existing during time T1 to T3, applied at the input of the second peak detector 7, in the same time interval, T1 to T6, corresponding to the leading component of the signal represented by curve A, during such time interval. Therefore the positive signal present at the input of the second peak detector 7 is peak amplitude detected, and immediately, at time T1, the storage capacitor associated with the second peak detector 7, charges up to the peak amplitude of the signal detected, as illustrated by curve "C," FIG. 3, during the T1 to T6 time interval. It should be observed that such charge on the storage capacitor is maintained substantially constant until time T6, at which time both peak amplitude detectors 1 and 7 are discharged. The outputs of the peak amplitude detectors 1 and 7, in the negative and positive going channels are instantaneously subtracted from one another by the subtracter 11, and the resulting waveform, during time interval T1 to T6, is illustrated by curve "E," FIG. 3. It should also be noted that the output of the subtracter 11, during time interval T1 to T6, is proportional to the peak amplitude of the leading component of composite input bipolar signal represented by curve A, FIG. 3 and of the same polarity. As there are three channels of information or additional successive doubleted sample pulses being transmitted to input terminal 15, it is necessary to provide a means for discharging the voltages stored in both peak amplitude detectors 1 and 7, that is the voltages stored in their respective storage capacitors. This is done by providing a plurality of gating means which are used to short the storage capacitors to ground thus discharging the voltages stored in the respective storage capacitors, thereby permitting continuous and successive peak amplitude detection of each individual doubleted sample pulse in each successive pulse train. These gating circuits 3 and 9, are operated by a train of recycling pulses applied to terminal 35, which are derived from a recycling clock source 33 having a repetition rate equal to the channel repetition rate of the composite input bipolar signals. These recycling pulses are applied in such time sequence, or at such a repetition rate, so as not to interfere with the proper operation of the overall circuit, and are represented by curve "B," FIG. 3. As illustrated by curve B, they are timed so as to occur at a time which is between the occurrence of each of the several doubleted sample pulses, which, as represented by curve B, occurs at the beginning of each cycle of the doubleted sample pulses. When these recycling pulses are applied to the gates 3 and 9, the signals stored in both the peak amplitude detectors 1 and 7, are then discharged, thereby permitting continuous peak detection. Referring now to the waveform represented by curve A, it should be observed, that the operation described previously in detail refers specifically to one cycle of the incoming composite bipolar signal, existing at the input terminal 15 during time interval T1 to T6. Stated otherwise, the operation, referred specifically to the time interval which PAM signals for one channel exist during a recycling repetition time interval. The operation will now be described as regards an incoming composite bipolar signal, represented by curve A, during time interval T6 to T13, which consists of a negative leading component and a positive lagging component. As illustrated by curve D, the signal corresponding to the negative leading component represented by curve A, during time T8 to T10, which is applied to the input of the first peak detector 1, in the negative going channel, immediately charges up in this peak detector storage capacitor. This is illustrated by curve D, during time T8 to T13. However, the signal corresponding to the lagging positive component, of this particular cycle or time interval T6 to T13, charges up, in storage capacitor of the second peak detector 7, in the positive going channel, starting at time T10, and continues until time T13. The output voltages stored in the two peak amplitude detectors 1 and 7, are instantaneously subtracted from one another by the subtracter 11. The signal detected in the first peak detector 1 is instantaneously subtracted from the signal stored in the second peak detector 7, thereby resulting in a signal as illustrated by curve E, during time T8 to T11, which shows a signal, negative in polarity, and having a peak amplitude which is proportional to the peak amplitude of the original leading component of the particular cycle, channel 2, detected. The curves represented by FIG. 4 are only shown for purposes of background. Curve "A," FIG. 4, shows the plurality of original singlet unipolar information signals, each cycle or channel, of which, is both amplitude modulated in pulse form and time multiplexed. Curve "B" shows the same original unipolar signals doubleted. The original unipolar signals, which are shown by curve A, FIG. 4, are those signals that have been amplitude modulated and multiplexed, but which have not yet been doubleted. It will be observed that these signals are of a rather sharp, rectangular, pulse waveform, and as of yet, there has not been any deterioration in the waveform thereof. This is in contrast to the composite input bipolar signals, represented by curve A, FIG. 3, applied to the instant invention at input terminal 15. The composite input bipolar signals no longer look like ideal rectangular pulses, which are illustrated by curve B, FIG. 4. However, their peak amplitudes, nevertheless are proportional to their corresponding pulses illustrated by curve B, FIG. 4. Additionally, their relative polarities have also remained the same.

Thus, it is seen that this simple circuit has reconstituted the singlet information signals. More specifically, their amplitudes have been reconstituted and their polarities have been maintained, thereby providing an output signal, which is proportional in amplitude and of the proper polarity as the original singlet unipolar information signals, by converting doublet bipolar input signals to "unipolar output signals as originally constituted." It should be observed that the "unipolar output signals as originally constituted," may actually be bipolar signals in modulation terms, as each individual channel information sample pulse detected is either positive or negative, which together, the detected pulses, constitute a train of detected pulses of both polarities. Though not shown, a plurality of cathode followers could be used to provide proper impedance matching between the various electrical components, particularly between the peak amplitude detectors 1 and 7, and the subtracter 11, and after the amplifier-inverter 13. It should be observed that the subtracter 11, is a standard computing circuit which provides an instantaneous output voltage proportional to the instantaneous difference of the two input signal voltages, provided that the input signals are small enough for linear operation of the tubes, which make up the subtracter 11.

Obviously many modifications and variations of the present invention are possible in the light of the above teachings. It is therefore to be understood that within the scope of the appended claims the invention may be practiced otherwise than as specifically described.

What is claimed is:

1. A circuit for converting doublet bipolar input signals to unipolar output signals as originally constituted, comprising;
- a pair of parallel channel means, one of which includes
  - a negative going channel means comprising,
    - first peak detection means having a first storage means for charging up to the peak amplitude of an input signal detected,
    - first gating means, coupled to said first storage means, for discharging the detected signal stored therein, thereby rendering said first peak detection means operative for successive detection of the input signals;
- and the other channel means includes,
  - a positive going channel means comprising,
    - phase inverter means,
    - second peak detection means, coupled to said phase inverter having a second storage means for charging up to the peak amplitude of an input signal detected,
    - second gating means, coupled to said second storage means, for discharging the detected signal stored therein, thereby rendering said second peak detection means operative for successive detection of the input signal,
- coupling means for connecting the bipolar input signals to said positive and negative going channel means;
- recycling means, coupled to each of said first and second gating means, for operating said gating means at a repetition rate equal to the channel repetition rate of the input bipolar signals;
- and subtraction means, coupled to said first and second storage means for instantaneously subtracting the voltage stored in the first storage means from the voltage stored in the second storage means thereby providing output signals which are proportional in amplitude, and of the same polarity as the original unipolar signals.

2. A circuit for converting doublet bipolar input signals to unipolar output signals as originally constituted, comprising;
- a pair of parallel channel means, one of which includes;
  - a negative going channel means comprising,
    - first peak detection means having a first storage means for charging up, each cycle, to the peak amplitude of an input signal detected,
    - first gating means, coupled to said first storage means, for discharging the detected signal stored therein, thereby rendering said first peak detection means operative for successive detection of each cycle of the input signal;
- and the other channel means includes;
  - a positive going channel means comprising,
    - phase inverter means,
    - second peak detection means, coupled to said phase inverter means, having a second storage means for charging up, each cycle, to the peak amplitude of an input signal detected,
    - second gating means, coupled to said second storage means, for discharging the detected signal stored therein, thereby rendering said second peak detection means operative for successive detection of each cycle of the input signal,
- coupling means for connecting the bipolar unit signals to said positive and negative going channel means;
- recycling means, coupled to each of said first and second gating means, for operating said gating means at a repetition rate equal to the channel repetition rate of the input bipolar signals;

and subtraction means, coupled to said first and second storage means for instantaneously subtracting the voltage stored in the first storage means from the voltage stored in the second storage means thereby providing output signals which are proportional in amplitude, and of the same polarity as the original unipolar signals.

References Cited by the Examiner

UNITED STATES PATENTS

| | | | |
|---|---|---|---|
| 2,973,509 | 2/1961 | Majerus et al. | 328—61 X |
| 2,996,613 | 8/1961 | Glomb | 329—109 |

ROY LAKE, *Primary Examiner.*

A. L. BRODY, *Assistant Examiner.*